United States Patent
Tillman, Sr.

[11] Patent Number: 5,971,761
[45] Date of Patent: Oct. 26, 1999

[54] EDUCATIONAL ELECTRONIC BABY MAT

[76] Inventor: Chitunda Tillman, Sr., 257 W. 61st Pl. Apt. 1, Chicago, Ill. 60621

[21] Appl. No.: 09/190,072

[22] Filed: Nov. 12, 1998

[51] Int. Cl.$^6$ .................................................. G09B 19/00
[52] U.S. Cl. ............................ 434/81; 434/159; 434/167
[58] Field of Search ................... 5/143; 434/81, 434/156, 159, 167, 169, 170, 321; 446/143, 175, 397, 484, 485, 486; 273/455, 460

[56] References Cited

U.S. PATENT DOCUMENTS

| | | | |
|---|---|---|---|
| 2,498,578 | 2/1950 | Reinnagel | 434/159 X |
| 2,624,127 | 1/1953 | Okahara | 434/159 |
| 2,994,889 | 8/1961 | Oblander . | |
| 3,146,534 | 9/1964 | Brown et al. | 434/169 |
| 3,252,230 | 5/1966 | Donev | 434/169 |
| 3,378,948 | 4/1968 | Gervaise . | |
| 4,258,251 | 3/1981 | Donaldson | 434/81 |
| 4,326,710 | 4/1982 | Breslow | 434/321 |
| 4,841,587 | 6/1989 | Carter . | |
| 4,934,079 | 6/1990 | Hoshi | 40/427 |
| 4,972,533 | 11/1990 | Brown | 5/143 |
| 5,478,268 | 12/1995 | Au . | |
| 5,784,733 | 7/1998 | Rasamy . | |
| 5,813,861 | 9/1998 | Wood | 434/167 X |

*Primary Examiner*—Sam Rimell
*Attorney, Agent, or Firm*—Barbara R. Greenberg

[57] ABSTRACT

An educational electronic baby mat having means for auditory and visual responses to user motion or pressure stimuli including a top layer having a plurality of symbols inscribed on a plurality of light transmitting zones adapted to be compressed by a baby or child thereby impacting middle layer light diffusers. The light diffusers impact electrical conducting contacts that impinge upon contact points located within electrical circuits on a flexible printed circuit board to activate indicator lights and auditory recitations associated with each compressed symbol. Alternatively, a motion sensor detects a baby or child's movements and preprogrammed sound and visual responses indicating the identity of top layer symbols are activated.

7 Claims, 4 Drawing Sheets

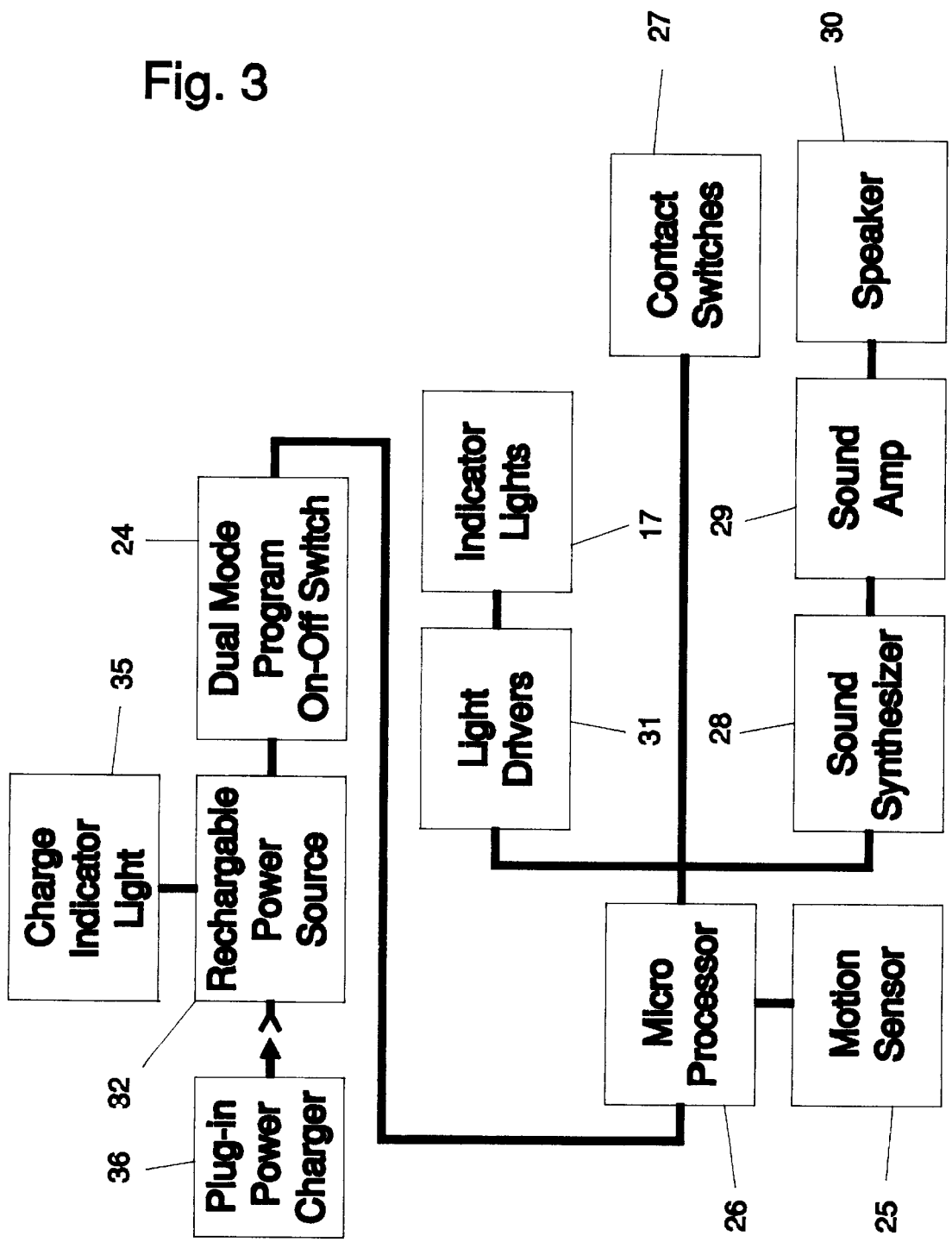

EDUCATIONAL ELECTRONIC BABY MAT

BACKGROUND OF THE INVENTION

1. Field of the Invention

The present invention relates to a mat or pad, and more particularly to a baby teaching mat displaying symbols, such as letters and numerals that are expressed visually and orally in response to activity performed by a baby or small child in contact with the mat.

It is well known that babies or small children crawl, sit and play on mats and are attracted by colors and pictures displayed on a mat surface and objects attached to the mat covering. There are mats that produce sounds to soothe and amuse a baby or small child placed on the mat. The present invention contemplates an educational baby mat having symbols such as letters and numerals on the mat surface so that pressure or motion activated light and sound devices associated with each letter and numeral emit light and broadcast the identity of the symbol that is pressed. As the baby or small child moves about on the mat, it will repeatedly hear and see a certain symbol. This repetition will teach the baby or small child the identity of the symbol.

2. Description of the Prior Art

Decorated mats for babies and children that produce sound in response to pressure are well known. For example, U.S. Pat. No. 5,784,733 discloses a child's blanket equipped with a small, musical sounding device with a manually operated switch and timing device to control the sound duration. U.S. Pat. No. 4,841,587 describes a transportable mat having a stereo sound system built directly into a pillow portion of the mat. U.S. Pat. No. 3,378,948 contemplates an elongated cylindrical pillow having a plurality of bells mounted either within or on the pillow. U.S. Pat. No. 2,994,889 describes a mat or pad for a child containing cells with sound units that are actuated by air to produce a whistling noise when the cells are depressed. Although the abovementioned patents disclose mats or pads that produce sounds from pressure stimulus, none of the mats or pads provide a simultaneous combination of light and sound when pressure is applied to a mat or pad area nor do they provide a choice between a motion sensor mode or a pressure actuated mode.

It is therefore a primary object of the present invention to provide an infant or child's mat that displays light and sound when the infant or child presses a particular symbol on the mat and to provide a choice between motion or pressure modes of operation.

Another object of the invention is to provide a symbol teaching device for an infant or child that can be used to teach such symbols as alphabet letters and numerals by reinforcing audibly and visually the names and appearance of the letters and numerals.

An additional object of the invention is to provide an early childhood teaching device that will give children a head start in learning basic skills necessary for success in school and life.

Another object of the invention is to hold a child's attention and entertain a child with meaningful words and symbols.

SUMMARY OF THE INVENTION

To achieve the above stated objectives, the present invention includes an educational baby mat responsive to pressure applied by a crawling baby or walking toddler. As pressure is applied to a symbol displayed on the mat surface, the symbol's identity is heard and the symbol is illuminated. In the alternative, a motion sensor detects the presence of a baby or toddler and responds with a preprogrammed audio and visual presentation.

The mat of the present invention comprises a top layer having a plurality of symbols inscribed on the top layer surface, a middle layer flexible printed circuit board with indicator lights surrounded by light diffusing structures and a wear resistant padded bottom layer. The top layer surface symbols are placed on a plurality of spaced apart transparent and/or translucent light transmitting zones for optimum light transmission. In a preferred embodiment a plurality of molded projections from the top layer bottom surface directed toward a middle layer provide compartments that receive middle layer light diffusion structures. Alternatively, light diffusion structure compartments may be achieved by sewing, attaching with Velcro or using other securing means to connect the perimeter of the middle layer light diffusion structures to the perimeter of the top layer symbol zones. In addition, the top layer symbol zones can be recessed to telescopically receive the middle layer light diffusion structures. The middle layer flexible printed circuit board is secured to the bottom layer with staples, by sewing or other securing means.

In a preferred embodiment, the flexible circuit board provides appropriate memory and audio and visual circuitry comprising a microprocessor, means for producing auditory sounds such as a sound synthesizer, a sound amplifier, a speaker, light drivers and light sources, a motion sensor, a dual mode on off switch and a rechargeable power source. The visual circuitry can include 555 timing circuits that can operate to pulse and turn light sources off and on. All of the above electronic parts and structures are already well known in the art. The dual mode on off switching means and a power supply housing are advantageously accessed on the mat bottom where an adult, and not a baby or small child, can easily make contact. The dual mode on off switching means comprises a double throw switch so that a center position turns the mat audio and visual on or off and remaining switch positions can place the mat in a motion sensor mode or a pressure point actuation mode.

In the motion sensor mode, motion from a moving mat user detected by a motion sensor can activate preprogrammed audible responses such as alphabet letter recitations in ascending order, A, B, C, D, or in random order, R, C, P, S, along with a simultaneous visual display of the corresponding letters. Numerals, vowels and consonants are additional symbols for audible recitation of their identities and simultaneous visual actuation. Colors, shapes and animal figures that appear as the mat surface artwork may also be appropriately programmed thereby teaching a small child the name and/or configuration of the symbol. A plurality of symbols and a plurality of colors are available for the educational mat surface artwork and simultaneous sound and light identification. Sound programming can be accomplished in a variety of languages. When the baby or child's motion ceases, soothing music such as a lullaby can ensue.

In the pressure point actuation mode, pressure from a crawling baby or walking toddler on a mat symbol or symbol zone causes voice actuation that identifies the symbol and light actuation that highlights the symbol. Microprocessor timer circuitry such as standard 555 circuits provide a preset time duration and automatic shut off for light operation and steady or pulsating light signals. If the baby or child applies pressure to several symbols or symbol zones nearly simultaneously, the microprocessor can be designed to activate individual lights and voice identification in the order pressed even if the time difference is as small as a millisecond and play back the voice and light signals at a slow pace, about every second or second and a half so that the baby or child can comprehend and learn the symbol.

In other embodiments of the invention, an educational electronic baby mat as described above but with a single mode switch can include only the motion sensor mode or, in the alternative, only the pressure point actuation mode.

The mat perimeter can be configured in geometric shapes such as a square or a rectangular shape, and in additional embodiments the mat can have ring shaped, circular, oval or serpentine configurations.

The educational electronic baby mat top layer can be constructed of pliable waterproof padded material that is quilted for durability with symbols placed on transparent and/or translucent light transmitting zones, preferably of a flexible plastic like material. The bottom layer can also be padded with access to the dual mode on off switching means and to the power source. The mat can be sized to fit a floor area, a crib or bed or to fit the particular needs of a certain user.

BRIEF DESCRIPTION OF THE DRAWINGS

FIG. 3 is a block diagram showing the audio and visual circuitry disposed in the flexible printed circuit board of the mat.

DETAILED DESCRIPTION OF A PREFERRED EMBODIMENT

Figure 1:
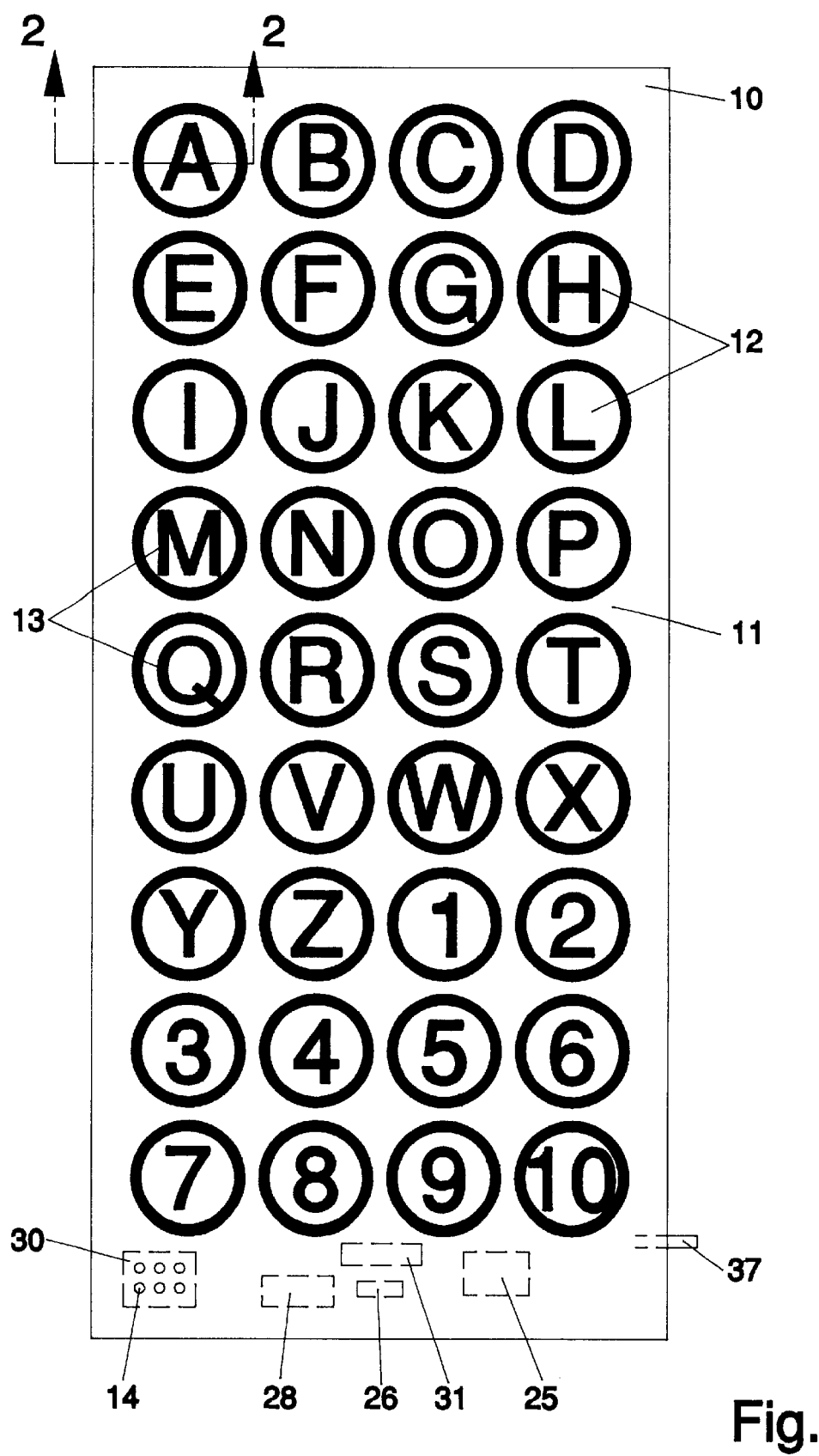
FIG. 1 is a top plan view showing symbols, symbol zones and visual and auditory components in the preferred embodiment of the educational electronic baby mat.

Referring to FIG. 1, the educational electronic baby mat 10 comprises a top layer 11 having a plurality of spaced apart transparent and/or translucent light transmitting zones 12, either colored or clear, surrounding a plurality of symbols 13 and speaker output perforations 14. The symbols 13 can be displayed in a medley of colors or black and white or a combination of color and black and white. Word, letter and numeral symbols can be in a variety of fonts, languages and printing styles. In a preferred embodiment of the present invention, the symbols 13 consist of twenty six letters of the English alphabet and numerals one through ten.

The mat top layer 11 can be fabricated of a padded waterproof plasticized material, quilted or not quilted. In addition, the mat top layer 11 can be a soft material such as flannel, corduroy or chenille that is padded and quilted. The transparent and/or translucent zones light transmitting zones 12 can be made of a flexible plastic material and can be recessed for clearer definition. Transparent or translucent colored lenses that are placed over zones 12 to change colors can be supplied.

Figure 2:
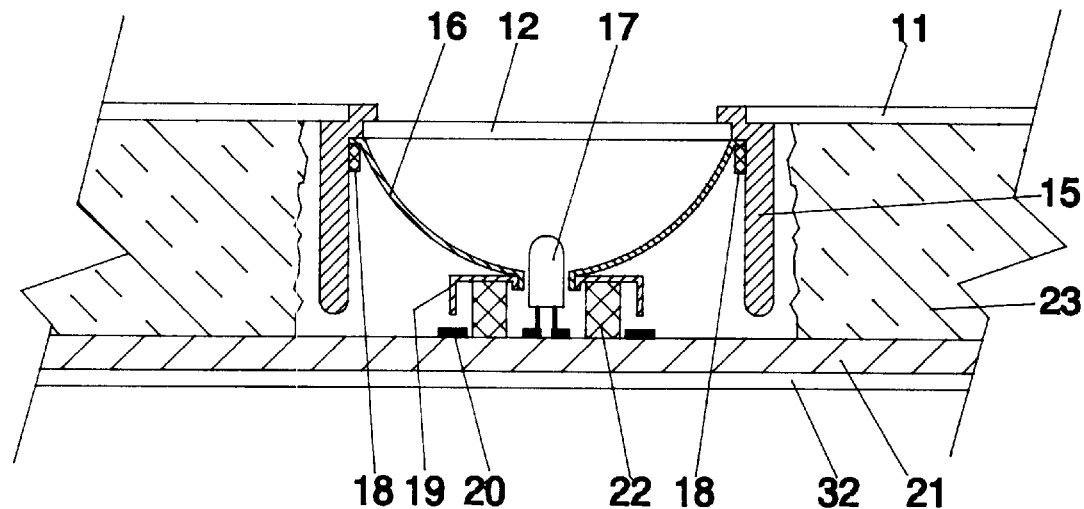
FIG. 2 shows a sectional view of a light diffusion and electrical contact structure taken along line 2—2 of FIG. 1.
Figure 2A:
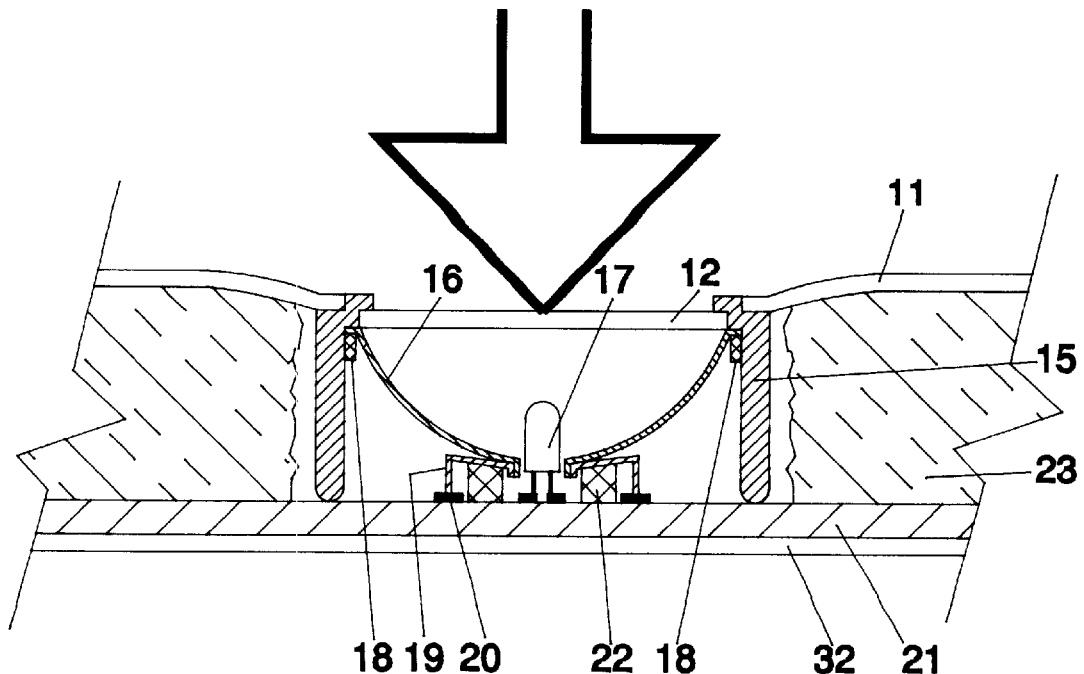
FIG. 2(a) shows a sectional view of a light diffusion and electrical contract structure taken along line 2—2 of FIG. 1 after pressure has been applied to a symbol or symbol zone.

Referring to FIG. 1 and FIGS. 2 and 2(a) which are sectional views taken along line 2—2 of FIG. 1, the mat 10 top layer 11 bottom surface has a plurality of compartment creating projections 15 directed toward a middle layer. A plurality of compartments are arranged so that each compartment holds a cup shaped light diffuser 16 having an indicator light source 17 such as a light emitting diode or an incandescent filament bulb contained within the light diffuser 16 and wired to an electronic printed circuit. The diffuser 16 is secured to projections 15 by friction force for containment within a compartment. In the alternative, diffuser 16 is secured to projections 15 with clamping springs 18. In addition, diffuser 16 can be telescopically inserted into the rim of a recessed light transmitting zones 12. As illustrated in FIG. 2(a), the diffuser 16, responding to pressure on a transparent or translucent zone 12, can move to impinge adjacent electrical conducting contacts 19 on to oppositely disposed contact points 20 located on a middle layer flexible printed circuit board 21 and at the same time also compresses resilient blocks 22, which, upon pressure release, spring back into an original shape and position and thereby moving the diffuser 16 along with contacts 19 back to their original location as seen in FIG. 2. In place of resilient blocks 22, spring means for contacts 19 touch and release movement is appropriate. Projections 15 can be constructed from a firm durable material such as dense polyethylene so that projections 15 upon compression of transparent or translucent zone 12 act as stops to prevent damage to electrical conducting contacts 19 and oppositely disposed contact points 20. A soft resilient filler material 23 such as latex foam or sponge rubber can be placed between the middle layer flexible circuit board 21 and the top layer 11 in spaces between compartment creating projections 15.

The middle layer flexible printed circuit board 21 is embedded with circuitry as illustrated in FIG. 3. A dual mode on off switch 24 providing selection of mode of operation allows a user to turn the mat 10 on and off, to set the mat 10 in a motion sensor 25 mode so that an infant's or child's motion will activate a microprocessor 26 on the flexible printed circuit board 21 to initiate a preprogramed auditory and visual response or to set the mat 10 in a single point actuation mode where electrical conducting contacts 19 impinge on oppositely disposed contact points 20 to close contact switches 27 that activate microprocessor 26 to initiate audio and visual responses to the user's symbol 13 selections.

The microprocessor 26 provides logic that instructs a sound synthesizer 28 message that identifies activated symbols and provides appropriate music. The sound synthesizer message is amplified by a sound amplifier 29 and sent to a speaker 30 and microprocessor 26. Also, the microprocessor 26 activates light drivers 31 that amplify current to activate indicator light sources 17 which are affixed to circuit board 21. A power source 32 has a housing 33 that opens where a mat bottom layer 34 lower surface meets a supporting surface such as a floor or bed and can be closed by screw means so that a baby or small child can not come in contact with the power source 32 which can be a nickel cadmium battery, a nickel metal hydride battery or any dry cell power pack. See FIG. 4. The dual mode on off switch 24 is also placed in the bottom layer 34 lower surface so an adult can control the mat 10 dual mode on off switch 24. The power source 32 can be equipped with a charge light 35 and a plug in charger 36 equipped to be inserted into a charger port 37.

Figure 4:
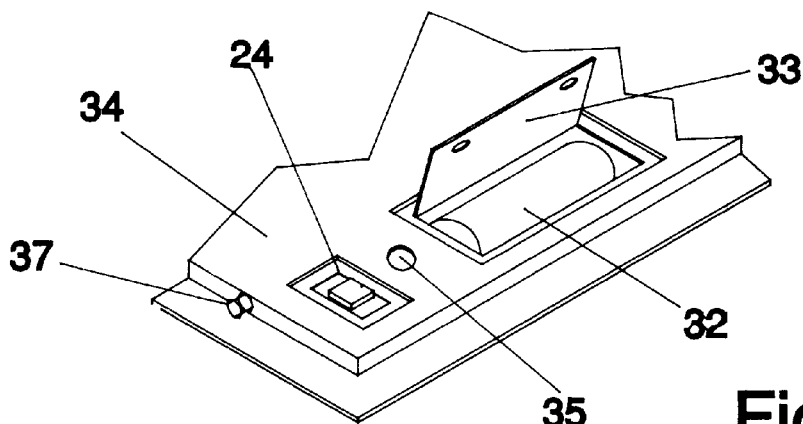
FIG. 4 is a bottom plan view showing switching means and power source housing placement.
Figure 5:
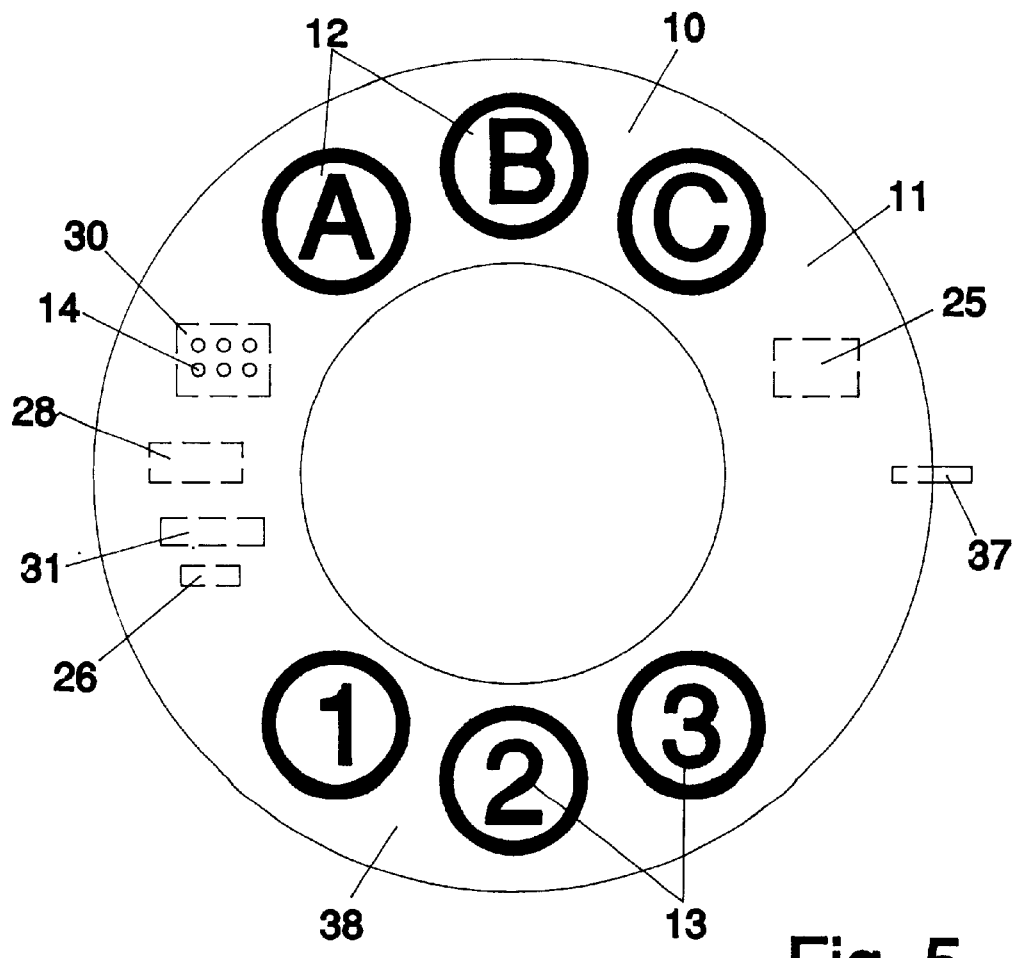
FIG. 5 is a top plan view of an alternative embodiment of the mat having a ring shaped configuration.

As illustrated in FIG. 5, in another embodiment of the invention, the educational electronic baby mat 10 is configured in a ring shape 38. In addition, an infinite number of geometric shapes including rectangular, square, circular, oval and serpentine shaped mats can be constructed all with a plurality of transparent or translucent light transmitting zones 12 and a plurality of symbols 13 inscribed therein, the middle layer flexible printed circuit board 21 with means for indicator light 17 activation as illustrated in FIGS. 2, 2(a) and FIG. 3, and bottom layer 34 with power source 32 and power source housing 33 along with the dual mode on off switch 24 as seen in FIG. 4.

A further embodiment of the invention comprises a single mode on off switch wherein the motion sensor 25 only activates auditory and visual responses or, in the alternative, a single mode on off switch provides visual and auditory responses only in a pressure point actuation mode as illustrated in FIGS. 2 and 2(a).

It is to be understood that the foregoing disclosure is representative of preferred embodiments of the invention and is to be interpreted as illustrative rather than limiting. Variations in form and details of the invention may be made by those skilled in the art without departing from the spirit of the invention disclosed and such revisions are intended to fall within the scope of the following claims:

What is claimed is:

1. An educational electronic baby mat having means for providing auditory and visual responses to user stimuli comprising:

a top layer having a plurality of symbols inscribed on a plurality of spaced apart light transmitting zones on said top layer surface;

a plurality of compartment creating projections directed toward a middle layer; and said middle layer having a plurality of indicator light sources;

said indicator light sources contained within a plurality of light diffusers;

said light diffusers adjacent to a plurality of electrical conducting contacts;

said electrical conducting contacts oppositely disposed from electrical contact points;

means for electrically actuating said indicator light sources and audible recitations; and means for securing said light diffusers within said mat a bottom layer having means for mode of operation switching;

a power source; and a power source housing all mounted in said bottom layer lower surface.

2. The educational electronic baby mat as described in claim 1 wherein said electrical conducting contacts are in touch with resilient structures adapted to compress when pressure is applied to said conducting contacts and spring back when pressure is released.

3. The educational electronic baby mat as described in claim 1 wherein resilient filler is disposed between said top layer and said middle layer in spaces defined by said compartment creating projections.

4. The educational electronic baby mat as described in claim 1 wherein means for electronically actuating said auditory and visual response includes a motion detector.

5. The educational electronic baby mat as described in claim 1 wherein means for electronically actuating said auditory and visual responses includes a printed circuit.

6. The educational electronic baby mat as described in claim 1 wherein said mat perimeter shape is a geometric shape.

7. The educational electronic baby mat as described in claim 1 wherein said mat is configured into a ring shape.

* * * * *